(12) United States Patent
Daugaard et al.

(10) Patent No.: US 9,909,067 B2
(45) Date of Patent: Mar. 6, 2018

(54) STAGED BIOMASS FRACTIONATOR

(71) Applicant: Cool Planet Energy Systems, Inc., Camarillo, CA (US)

(72) Inventors: Daren Daugaard, Camarillo, CA (US); Davy Tong, Camarillo, CA (US); Vern S. Traxler, Simi Valley, CA (US); Vital Aelion, Denver, CO (US); Gary Podrebarac, Camarillo, CA (US); James Hillier, Camarillo, CA (US); Michael C. Cheiky, Thousand Oaks, CA (US)

(73) Assignee: COOL PLANET ENERGY SYSTEMS, INC., Greenwood Village, CO (US)

( * ) Notice: Subject to any disclaimer, the term of this patent is extended or adjusted under 35 U.S.C. 154(b) by 629 days.

(21) Appl. No.: 14/196,920

(22) Filed: Mar. 4, 2014

(65) Prior Publication Data

US 2014/0183022 A1 Jul. 3, 2014

Related U.S. Application Data

(60) Continuation-in-part of application No. 13/797,985, filed on Mar. 12, 2013, which is a
(Continued)

(51) Int. Cl.
*C10B 47/02* (2006.01)
*C10B 7/10* (2006.01)
(Continued)

(52) U.S. Cl.
CPC ............... *C10B 7/10* (2013.01); *C10B 47/02* (2013.01); *C10B 47/44* (2013.01); *C10B 49/16* (2013.01);
(Continued)

(58) Field of Classification Search
CPC ......... C10B 47/02; C10B 47/44; C10B 53/00; C10L 5/44–5/447
See application file for complete search history.

(56) References Cited

U.S. PATENT DOCUMENTS

| 203,016 A | 4/1878 | Edison |
|---|---|---|
| 222,390 A | 12/1879 | Edison |

(Continued)

FOREIGN PATENT DOCUMENTS

| CN | 201125229 Y | 10/2008 |
|---|---|---|
| DE | 2802212 A1 | 7/1979 |

(Continued)

OTHER PUBLICATIONS

Buerschaper, R., "Thermal & Electrical Conductivity of Graphite & Carbon at Low Temperatures," Jour. of App. Physics; (1994) pp. 452-454.

(Continued)

*Primary Examiner* — Jonathan Miller
(74) *Attorney, Agent, or Firm* — Wilmer Cutler Pickering Hale and Dorr LLP

(57) ABSTRACT

Various biomass reactors systems and methods of pyrolyzing biomass are disclosed. One type of biomass reactor system comprises a plurality of biomass processing stations configured in series, each station comprising an auger reactor including an auger inlet for receiving biomass and a transfer screw for conveying the biomass through the auger reactor.

26 Claims, 11 Drawing Sheets

Related U.S. Application Data continuation-in-part of application No. 13/398,596, filed on Feb. 16, 2012, now abandoned, which is a division of application No. 12/688,523, filed on Jan. 15, 2010, now Pat. No. 8,216,430.

(60) Provisional application No. 61/891,872, filed on Oct. 16, 2013, provisional application No. 61/881,309, filed on Sep. 23, 2013, provisional application No. 61/799,446, filed on Mar. 15, 2013, provisional application No. 61/146,079, filed on Jan. 21, 2009.

(51) Int. Cl.

| | | |
|---|---|---|
| *C10L 5/44* | (2006.01) | |
| *C10B 47/44* | (2006.01) | |
| *C10B 53/02* | (2006.01) | |
| *C10B 57/02* | (2006.01) | |
| *C10C 5/00* | (2006.01) | |
| *F26B 3/18* | (2006.01) | |
| *F26B 25/00* | (2006.01) | |
| *F23G 5/027* | (2006.01) | |
| *F23G 5/16* | (2006.01) | |
| *F23G 5/50* | (2006.01) | |
| *F23G 7/10* | (2006.01) | |
| *C10B 49/16* | (2006.01) | |

(52) U.S. Cl.
CPC ............. *C10B 53/02* (2013.01); *C10B 57/02* (2013.01); *C10C 5/00* (2013.01); *C10L 5/44* (2013.01); *F23G 5/027* (2013.01); *F23G 5/16* (2013.01); *F23G 5/50* (2013.01); *F23G 7/10* (2013.01); *F26B 3/18* (2013.01); *F26B 25/002* (2013.01); *F23G 2201/304* (2013.01); *F23G 2202/60* (2013.01); *F23G 2203/8013* (2013.01); *F23G 2204/20* (2013.01); *F23G 2900/50001* (2013.01); *F26B 2200/02* (2013.01); *Y02E 50/14* (2013.01)

(56) References Cited

U.S. PATENT DOCUMENTS

| | | | |
|---|---|---|---|
| 474,230 A | 5/1892 | Edison | |
| 3,464,892 A * | 9/1969 | Bennett | C10B 7/00 201/14 |
| 4,118,282 A * | 10/1978 | Wallace | C01B 31/02 201/2.5 |
| 4,268,275 A | 5/1981 | Chittick | |
| 4,421,524 A | 12/1983 | Chittick | |
| 4,487,958 A | 12/1984 | Ream et al. | |
| 4,497,637 A | 2/1985 | Purdy et al. | |
| 4,501,644 A | 2/1985 | Thomas | |
| 4,530,702 A | 7/1985 | Fetters et al. | |
| 4,861,351 A | 8/1989 | Nicholas et al. | |
| 4,992,480 A | 2/1991 | Mahajan et al. | |
| 5,017,269 A | 5/1991 | Loomans | |
| 5,032,618 A | 7/1991 | Marchionna et al. | |
| 5,087,786 A | 2/1992 | Nubel et al. | |
| 5,221,290 A | 6/1993 | Dell | |
| 5,411,714 A | 5/1995 | Wu et al. | |
| 5,504,259 A | 4/1996 | Diebold et al. | |
| 5,720,232 A | 2/1998 | Meador | |
| 5,756,194 A | 5/1998 | Shogren et al. | |
| 5,820,640 A | 10/1998 | Ikura et al. | |
| 5,857,807 A | 1/1999 | Longo, Sr. | |
| 6,133,328 A | 10/2000 | Lightner | |
| 6,227,473 B1 | 5/2001 | Arnold | |
| 6,264,891 B1 | 7/2001 | Heyneker et al. | |
| 6,339,031 B1 | 1/2002 | Tan | |
| 6,548,026 B1 | 4/2003 | Dales et al. | |
| 6,747,067 B2 | 6/2004 | Melnichuk et al. | |
| 6,811,703 B2 | 11/2004 | Elliott | |
| 6,830,597 B1 | 12/2004 | Green | |
| 6,841,085 B2 | 1/2005 | Werpy et al. | |
| 6,923,838 B2 | 8/2005 | Maubert et al. | |
| 6,994,827 B2 | 2/2006 | Safir et al. | |
| 7,033,972 B2 | 4/2006 | Shikada et al. | |
| 7,226,566 B2 | 6/2007 | Beierle | |
| 7,438,785 B2 | 10/2008 | Meier et al. | |
| 7,458,999 B2 | 12/2008 | Schenck et al. | |
| 7,748,653 B2 | 7/2010 | Palm | |
| 7,846,979 B2 | 12/2010 | Rojey et al. | |
| 7,857,943 B2 | 12/2010 | Noto | |
| 7,888,540 B2 | 2/2011 | Deluga et al. | |
| 7,942,942 B2 | 5/2011 | Paoluccio | |
| 8,143,464 B2 | 3/2012 | Cheiky et al. | |
| 8,216,430 B2 | 7/2012 | Cheiky | |
| 8,236,085 B1 | 8/2012 | Cheiky et al. | |
| 8,383,871 B1 | 2/2013 | Sellars et al. | |
| 8,541,637 B2 | 9/2013 | Babicki et al. | |
| 2003/0119952 A1 | 6/2003 | Werpy et al. | |
| 2003/0228196 A1 * | 12/2003 | Satchwell | B09B 3/00 405/128.5 |
| 2004/0111968 A1 * | 6/2004 | Day | C05C 9/005 48/197 FM |
| 2006/0280669 A1 | 12/2006 | Jones | |
| 2007/0266623 A1 | 11/2007 | Paoluccio | |
| 2008/0006519 A1 | 1/2008 | Badger | |
| 2008/0093209 A1 | 4/2008 | Noto | |
| 2008/0216391 A1 | 9/2008 | Cortright et al. | |
| 2008/0223268 A1 | 9/2008 | Gehring et al. | |
| 2008/0223269 A1 | 9/2008 | Paoluccio | |
| 2008/0280338 A1 * | 11/2008 | Hall | C10B 53/02 435/161 |
| 2008/0300435 A1 | 12/2008 | Cortright et al. | |
| 2008/0317657 A1 | 12/2008 | Hall et al. | |
| 2009/0007484 A1 | 1/2009 | Smith | |
| 2009/0139139 A1 | 6/2009 | Tilman et al. | |
| 2009/0151251 A1 | 6/2009 | Manzer et al. | |
| 2009/0183430 A1 | 7/2009 | Schubert et al. | |
| 2009/0217575 A1 | 9/2009 | Raman et al. | |
| 2009/0253947 A1 | 10/2009 | Brandvold et al. | |
| 2009/0308787 A1 | 12/2009 | O'Connor et al. | |
| 2010/0040510 A1 | 2/2010 | Randhava et al. | |
| 2010/0101141 A1 | 4/2010 | Shulenberger et al. | |
| 2010/0133086 A1 | 6/2010 | Kawami et al. | |
| 2010/0162780 A1 | 7/2010 | Scharf | |
| 2010/0180805 A1 | 7/2010 | Cheiky | |
| 2010/0218417 A1 | 9/2010 | Bauldreay et al. | |
| 2010/0223839 A1 | 9/2010 | Garcia-Perez et al. | |
| 2010/0242353 A1 | 9/2010 | Jovanovic et al. | |
| 2010/0257775 A1 | 10/2010 | Cheiky | |
| 2010/0270505 A1 | 10/2010 | Gallaspy et al. | |
| 2010/0300866 A1 | 12/2010 | van Aardt et al. | |
| 2011/0023566 A1 | 2/2011 | Lodwig et al. | |
| 2011/0177466 A1 | 7/2011 | Cheiky | |
| 2011/0212012 A1 | 9/2011 | McAlister | |
| 2011/0278149 A1 | 11/2011 | Hornung et al. | |
| 2012/0090221 A1 | 4/2012 | Banasiak et al. | |
| 2012/0205006 A1 | 8/2012 | Cheiky | |
| 2012/0205229 A1 | 8/2012 | Cheiky | |
| 2012/0228112 A1 | 9/2012 | Steele et al. | |
| 2012/0266529 A1 | 10/2012 | Scahill | |
| 2012/0285080 A1 | 11/2012 | Despen et al. | |
| 2012/0285814 A1 | 11/2012 | Del Monte et al. | |
| 2013/0020188 A1 | 1/2013 | Mohamad et al. | |
| 2013/0326935 A1 * | 12/2013 | Kimball | C10B 53/02 44/307 |

FOREIGN PATENT DOCUMENTS

| | | |
|---|---|---|
| GB | 191511481 A | 7/1916 |
| GB | 211368 A | 2/1924 |
| GB | 2303859 A | 3/1997 |
| KR | 100819505 | 4/2008 |
| WO | WO-2007121733 A2 | 11/2007 |
| WO | WO-2009004652 A1 | 1/2009 |
| WO | WO-2011060539 A1 | 5/2011 |
| WO | WO-2011097584 A1 | 8/2011 |
| WO | WO-2012167796 A1 | 12/2012 |

(56) References Cited

FOREIGN PATENT DOCUMENTS

OTHER PUBLICATIONS

Cheng, Chih-Hsin; "Stability of Black Carbon in Soils Across a Climatic Gradient," Jour. of Geophysical Research Biogeosciences; 113 (2008) G02027; pp. 1-10.
Chew, Thiam Leng, "Catalytic Processes Towards the Production of Biofuels in a Palm Oil and Oil Palm Biomass-based Biorefinery," Bioresource Tech. 99 (2008), pp. 7911-8922.
Demirbas, "Effects of Temperature & Particle Size on Bio-Char Yield from Pyrolysis of Agricultural Residues," J. Anal. Pyrolysis, vol. 72 (2004); pp. 243-248.
Elliott, D. C., "Liquid Fuels by Low-Severity Hydrotreating of Biocrude," Dev. in Thermochemical Biomass Conversion; vol. 1, pp. 611-621.
Extended European Search Report issued by the European Patent Office for Application No. 10733776.8 dated May 19, 2014 (7 pages).
Faludi, J.; "World Changing Change Your Thinking a Carbon-Negative Fuel;" Oct. 16, 2007; www.worldchanging.com (6 pages).
Gegver, E. & Hayek, K.; "A Fully Programmable System for the Study of Catalytic Gas Reactions," 1985 J. Physc. E: Sci, Instrum., vol. 18, p. 836.
International Search Report and Written Opinion issued by the U.S. Patent and Trademark Office as International Searching Authority for International Application No. PCT/US14/22390 dated Sep. 3, 2014 (7 pgs.).
International Search Report and Written Opinion issued by the U.S. Patent and Trademark Office as International Searching Authority for International Application No. PCT/US14/22753 dated Jul. 14, 2014 (9 pgs.).
Kim et al.; Characteristics of Crosslinked Potato Starch & Starch-Filled Linear Low-Density Polyethylene Films, Carbohydrate Polymers, vol. 50 (2002); pp. 331-337.
Laird, David; "The Charcoal Vision: A Win Win Scenario," 2008, Agron, J., vol. 100, No. 1, pp. 178-181.
Lehmann, J.; Nutrient Avail. & Leaching in an Archaeological Anthrosol & Ferraisol of the Central Amazon Basin: Fertilizer, Manure.; Plant Soil, vol. 249 (2003); pp. 343-357.
Lima, I. M., "Physiochemical & Adsorption Properties of Fast-Pyrolysis Bio-Chars & their Steam Activated Counterparts," J. Chem. Biotechnical (2010), vol. 85, pp. 1515-1521.
Mohan, Dinesh, "Pyrolysis of Wood/Biomass for Bio-Oil: A Critical Review," Energy & Fuels (2006) vol. 20, pp. 848-889.
Norman, et al.; "Best Management Practices for Reclaiming Surface Mines in Washington and Oregon," Open-File Report 0-92-2, revised ed. Dec. 1997; www.oregongeology.org Feb. 9, 2010 (128 pages).
Ogawa; "Carbon Sequestration by Carbonization of Biomass & Forestation; 3 Case Studies," Mitigation & Adaption Strategies for Global Change, vol. 11 (2006); pp. 429-444.
Omata, K.; "Optimization of Cu Oxide Catalyst for Methanol Synthesis under High C02 Partial Pressure Using Combinatorial Tools," App. Catalyst A: General, vol. 262 (2004), pp. 207-214.
Preston, C.M.; Black (Pyrogenic) Carbon: a Synthesis of Current Knowledge & Uncertainties w/Special Consideration of Boreal Regions; Biogeosciences, vol. 3 (2006); pp. 397-420.
Rosenberg, Z.; "More on Commercial Carbon Resistors as Low Pressure Gauges," Intl. Jour. of Impat Eng., vol. 34 (2007) pp. 732-742.
Sharma, Ramesh K., "Catalytic Upgrading of Pyrolysis Oil," Energy & Fuels (1993), vol. 7, pp. 306-314.
Takeishi, K.; "Dimethy Eethr & Catalyst Development for Production of Syngas," Biofuels (2010) vol. 1, No. 1, pp. 217,226.
Tryon, E.H.; "Effect of Charcoal on Certain Physical, Chemical, & Biological Properties of Forest Soils," Ecological Monographs, vol. 18, No. 1 (Jan. 1948); pp. 81-115.
Bassilakis, R. et al., "TG-FTIR Analysis of Biomass Pyrolysis", Fuel, vol. 80, pp. 1765-1786, 2001 (22 pages).
Basu, Prabir, "Biomass Gasification and Pyrolysis—Practical Design and Theory—3.8 Torrefaction," Elsevier, retrieved online from URL:<http://app/knovel.com/hotlink/pdf/id:kt00A4LBK4/biomass-gasification/torrefaction>, pp. 92-93 (2010).

\* cited by examiner

Plain Auger

Decreasing pitch

Increasing driveshaft diameter

STAGED BIOMASS FRACTIONATOR

RELATED APPLICATIONS

This application claims the benefit of priority under 35 U.S.C. § 119(c) to U.S. Ser. No. 61/799,446, filed Mar. 15, 2013, entitled "Staged Auger System", U.S. Ser. No. 61/881,309, filed Sep. 23, 2013, entitled "Thermal Biomass Processor" and U.S. Ser. No. 61/891,872, filed Oct. 16, 2013, entitled "System and Method for Synthesizing Renewable Chemicals Utilizing Simultaneous Parallel Fractionation," the contents of which are incorporated by reference.

This application also is a continuation-in-part application of U.S. Ser. No. 13/797,985, filed Mar. 12, 2013, entitled "Biomass Reactor," which is a continuation in part of U.S. Ser. No. 13/398,596, filed Feb. 16, 2012, entitled "Biomass Reactor", which is a divisional of U.S. Ser. No. 12/688,523, filed Jan. 15, 2010, entitled "System and Method for Biomass Fractioning" which claims priority from Provisional Application No. 61/146,079, filed Jan. 21, 2009, entitled "System and Method for Biomass Fractioning", the contents of which are incorporated by reference.

TECHNICAL FIELD

The field of the present invention relates generally to the production of renewable fuels, and more particularly to methods for the conversion of carbon containing material to produce product streams with specific properties. A subfield is a novel staged auger system for the production of renewable fuel.

DESCRIPTION OF THE RELATED ART

Rising energy costs, concerns about the continued use and availability of non-renewable sources, and concerns about the effects of the use of fossil resources on global climate change have become some of the major technological challenges facing humanity. Finding ways to more effectively use alternative sources of energy such as renewable biomass is an important avenue for addressing these issues. Prior to the beginning of the industrial revolution, wood and plant oils were the primary source of energy for pre-industrial civilizations, which used this energy mainly for heating, cooking, and light. During this early period, biomass was simply burned in open air to produce heat and light. Several thousand years ago, it was discovered that if the air supply was restricted during the burning process, a dense black residual (which we now call coke) could be extracted from burning wood. This hot coke could be quenched with water, dried, and re-burnt to produce a much hotter, denser fire. The emergence of coke proceeds in parallel with the development of metallurgy, which is dependent upon its hotter and cleaner fire along with its reducing capabilities to both extract metals from ore and form them into useful products. The process of roasting a combustible material in either a reduced oxygen environment or oxygen-free environment is now called pyrolysis. Pyrolyzing wood and other forms of mixed biomass produces coke (also called biochar) and a mixture of hydrogen, carbon monoxide and carbon dioxide, sometimes referred to as syngas. Roasting fossil fuel hydrocarbons in an oxygen-free environment first causes a breakdown of longer chain hydrocarbons into shorter chain hydrocarbons, ultimately resulting in more elemental forms such as methane ($CH_4$), hydrogen, and elemental carbon. In fact, pyrolysis is a fundamental mechanism of petrochemical cracking, which is the backbone of oil refinery processes. More extreme pyrolysis is used in the refinery process to produce hydrogen and high purity carbon.

Likewise, biomass (which is made up of cellulose, hemi-celluloses, lignin, starches, and lipids) proceeds through multiple stages of decomposition when subject to the pyrolysis process. Depending on the conditions of the pyrolysis, the composition of the products can be varied. In general, when subject to high temperatures (e.g., 800° C.) for prolonged periods of time, pyrolysis ultimately yields syngas. As the temperature and exposure time interval is reduced, an increasing amount of biochar residue remains. At still lower temperatures and time intervals, increasingly complex hydrocarbons and oxygenated hydrocarbons are present in the gas stream from the pyrolyzed biomass. These molecules form vapors that can be condensed and used as a liquid product (bio-oil) or converted immediately to other products. At the low extreme, simple everyday cooking typically drives off water and starts to de-hydrolyze the biomass, causing the darkening and carmelization that we all associate with cooked foods.

Various forms of laboratory and small scale commercial biomass pyrolyzers have been developed to generate useful chemical products from the controlled pyrolysis of biomaterials ranging from wood chips to sewage sludge. Although some pyrolyzers are focused simply on producing syngas, there is considerable effort in the development of milder pyrolyzing conditions, which typically results in a condensed liquid commonly called bio-oil. Many forms of pyrolyzers have been developed at the laboratory level to produce these intermediate compounds, which are collectively referred to as bio-oil or pyrolysis oil. Configurations include simple tube furnaces where the biomass is roasted in ceramic boats, ablative pyrolyzers where wood is rubbed against a hot surface, various forms of fluidized bed pyrolyzers where biomass is mixed with hot sand, and various simpler configurations that are based on earlier coking oven designs.

One common class of pyrolysis systems is the rotary kiln/screw auger that moves material by rotation through a channel using flights on a shaft and providing heat in some method.

The fundamental problem with the resultant pyrolysis oil from a biomass feedstock is that it is made up of hundreds to thousands of compounds, which are the result of subjecting the raw biomass to a wide range of temperature, time, and pressure profiles in bulk. When this process is complicated by the thousands of major bio-compounds in the original bio-feedstock, the result is a nearly intractable array of resultant compounds all mixed together. Pyrolysis oils from such processes are typically not thermodynamically stable. They contain active oxygenated free radicals that are catalyzed by organic acids and bases such that these oils typically evolve over a period of a few days from light colored liquids to dark mixtures with tar and resinous substances entrained in the mix. Also, attempts to re-vaporize pyrolysis oil typically result in additional chemical reactions, which produce additional biochar and a shift to lower molecular weight components in the resulting gas stream. Although fairly high yields of pyrolysis oil can be achieved in laboratory scale experiments, larger industrial scale demonstration projects typically produce much lower yield. This is presumably due to the wider range of temperatures, hold-times, and localized pressures within the much larger heated three dimensional volumes of such scale-up architectures.

One method to avoid the complications associated with pyrolysis oils is catalytic upgrading of the vapors before condensation. This process makes a fuel that is more stable than the pyrolysis oils. Unfortunately, catalytic conversion of bio vapors is associated with higher coking rates and catalytic deactivation.

The present invention aims to address how biomass may be more effectively fractionated.

SUMMARY

A method and system is described by which carbon containing material such as biomass is heated and thermally decomposed in one or more stages such that one or more vapor streams and one or more solid streams are produced each with beneficial characteristics. Exemplary beneficial characteristics may include lower coking rates in catalytic processes or solids with properties tailored to a specific use.

A system designed to carry out the method include an auger system having a plurality of biomass processing stations configured in series, each station comprising an auger reactor or portion of said auger including an auger inlet for receiving carbonaceous solid such as biomass and a transfer screw for conveying the solid through the auger reactor.

In some embodiments of the invention novel screw designs improve rigidity of the screw and promote mixing. The increased rigidity has benefits in a hot thermal environment.

Each auger reactor may further comprise a motor for driving the transfer screw and one or a plurality of exit ports for fractions of the pyrolysis vapor and associated systems configured for fractions of a pyrolysis vapor stream originating from the reactor.

In some embodiments of the above system, each auger reactor further comprises a heat carrier for heating the biomass and its decomposition products as it is conveyed through the auger reactor. The heat carrier may be selected from the group consisting of: heating coils within or surrounding the auger reactor, a hot transfer fluid flowing through the auger reactor, hot particles of sand passing through the auger reactor, and heated ferromagnetic solid particles. Additionally, the transfer screw may be heated by an external source. In some embodiments, a first auger reactor in the series includes a first type of heat carrier, wherein another auger reactor in the series includes a different type of heat carrier. In further embodiments, a first auger reactor in the series includes an exit port that terminates in an auger inlet of a second auger reactor, and a last auger reactor in the series terminates in an exit port that removes a biochar product from the system.

In other embodiments of the invention a novel heat carrier is used to transfer heat to the auger. Said heat carrier consists of a hollow particle constructed of a metal or ceramic which comprises the shell and containing a material different than the shell such that the internal material can be heated to change phases and whereby heat may be transferred to a thermal conversion process by the appropriate phase change of the internal material. The internal phase change material may fill completely or partially the volume within the shell while in the solid or liquid phase. The phase change material may be a metal or a salt that phase changes in the temperature range of 300° C. and 1000° C. (572° F. and 1832° F.).

Another embodiment of the invention is that the pyrolysis may be carried out with an appropriate amount of oxidizer or oxidizer and inert to promote heating. In this embodiment, a portion of the carbon containing material is oxidized thus providing heat to drive the pyrolysis process.

In one aspect a method of thermally decomposing biomass in a plurality of pyrolysis stations includes independently operating each of a plurality of pyrolysis stations by independently adjusting temperature and/or pressure, wherein at least one of the temperature and pressure are different; transferring said biomass and/or its subsequent thermal decomposition products into and out of said plurality of pyrolysis stations; wherein at least one, but not all, of said plurality of pyrolysis stations is operated under conditions selected to pyrolyze said biomass or its subsequent thermal decomposition products to produce a vapor stream suitable for fuel production, and directing said fuel-producing vapor stream to a catalytic column for conversion to fuel; wherein at least one, but not all, of said plurality of pyrolysis stations is operated under conditions to provide a second vapor stream, and directing the second vapor stream to a second location for use other than fuel production; and wherein the final station of said plurality of pyrolysis stations is operated under conditions selected to pyrolyze said incoming thermal decomposition products to produce a biochar and an associated vapor stream, and directing said vapor stream to a location for use other than fuel production.

In one or more embodiments, one or more stations comprises an auger used to convert the biomass to vapor and solid streams In one or more embodiments, the method produces at least one solid biochar stream for soil amendment purposes.

In one or more embodiments, the first station is preceded by one or more stations for drying and/or torrifaction of biomass.

In one or more embodiments, renewable chemicals are synthesized from one or more vapor products.

In one or more embodiments, a temperature within a second station in the series is incrementally higher than a temperature within a first station in the series, and wherein a temperature within a third station in the series is incrementally higher than a temperature within the second station.

In any of the preceding embodiments, the pressure of the first station is lower than the pressure of the second station, and wherein a pressure in the third station is lower than the pressure within the second station.

In another aspect, a system of thermally decomposing biomass in a plurality of pyrolysis stations includes independently operating each of a plurality of pyrolysis auger reactors by independently adjusting temperature and/or pressure, wherein at least one of the temperature and pressure are different; transferring said biomass and/or its subsequent thermal decomposition products into and out of said plurality of pyrolysis reactors; wherein at least one, but not all, of said plurality of pyrolysis auger reactors is operated under conditions selected to pyrolyze said biomass or its subsequent thermal decomposition products to produce a vapor stream suitable for fuel production, and directing said fuel-producing vapor stream to a catalytic column for conversion to fuel; wherein at least one, but not all, of said plurality of pyrolysis auger reactors is operated under conditions to provide a second vapor stream, and directing the second vapor stream to a second location for use other than fuel production; and wherein the final auger reactors of said plurality of pyrolysis stations is operated under conditions selected to pyrolyze said incoming thermal decomposition products to produce a biochar and an associated vapor stream, and directing said vapor stream to a location for use other than fuel production.

In one or more embodiments, one or more stations comprises a plurality of auger reactors used to convert the biomass to vapor and solid streams.

In one or more embodiments, each auger reactor further comprises a motor for driving the transfer screw.

In one or more embodiments, an auger can be oriented on a slant of 0° to 85° with respect to horizontal.

In one or more embodiments, filters, temperature quench, or cyclones are used to remove heavy coke forming or particulate components whereby catalyst coking rates are further decreased.

In one or more embodiments, each auger reactor further comprises a partial condenser configured to condense fractions of a portion of a pyrolysis vapor stream flowing from the auger reactor to reduce fouling and coking in a subsequent catalyst reactor.

In one or more embodiments, a catalyst is introduced into an auger reactor together with the biomass or its decomposition products.

In one or more embodiments, a heat carrier to provide the thermal energy for thermal decomposition of the biomass comprises the selected group: heating coils with or surrounding the reactor, electrically heated within or surrounding the auger, heated particles passing through the reactor, heated ferromagnetic solid particles, heated char particles, heated ash particles, and heated particles with a phase change material internal to the particle.

In one or more embodiments, a hollow particle constructed of a metal or ceramic which comprises the shell and containing a material different than the shell such that the internal material can be heated to change phases in the temperature range of 300° C. and 1000° C. and whereby heat can be transferred to pyrolyze the biomass by the appropriate phase change temperature of the internal material.

In one or more embodiments, an oxidizer is provided to a station to promote heating.

In one or more embodiments, transfer screw is heated by electrical means.

In one or more embodiments, the heat carrier for each stage is independent.

In one or more embodiments, the catalyst process includes a continuously regenerating catalyst system with multiple catalyst reactors.

In one or more embodiments, the stages are contained within the same auger shell.

In one or more embodiments, a first auger reactor in the series includes an exit port that terminates in an auger inlet of the second auger reactor.

In one or more embodiments, a last auger reactor in the series terminates in an exit port that removes a biochar product of the system.

In one or more embodiments, a plurality of vapor streams are removed from the system.

In one or more embodiments, a pressure within an auger reactor is selectively controllable by restricting the rate that products are withdrawn from reactor.

In one or more embodiments, a pressure within an auger is selectively controllable by introducing a gas or vapor stream into the reactor.

In one or more embodiments, the processing stations comprise a means for compressing ground biomass to control pressure in the solids.

In one or more embodiments, the means for compressing the biomass comprises a heated pulverizing pyrolysis processing station to control pressure in solids.

In one or more embodiments, the means for compressing the biomass comprises a continuously varying screw shaft diameter.

In one or more embodiments, a temperature within a second auger reactor in the series is incrementally higher than a temperature within a first auger reactor in the series, and wherein a temperature within a third auger reactor in the series is incrementally higher than a temperature within the second auger reactor.

In one or more embodiments, the temperature of each auger comprises a linearly varying temperature.

In one or more embodiments, the dimensions of each auger reactor are adjustable to allow more or less residence time for the biomass at each auger reactor.

In one or more embodiments, the pressure of the first auger is lower than the pressure of the second reactor, and wherein a pressure in the third auger is lower than the pressure within the second auger reactor.

In one or more embodiments, a plurality of systems are arranged in parallel for increased system throughput and optimized vapor and solid streams.

In another aspect, a transfer screw includes flights and a shaft wherein said flights can be attached to said shaft, wherein structures are implemented connecting two or more of said flights, wherein design of the transfer screw promotes mixing of biomass, wherein design of flights promotes mixing and/or vapor flow to exit ports, whereby design of said shaft promotes vapor flow and/or promotes ease of solids flow.

In one or more embodiments, said flights have a plurality of portions of the flight that are not present to promote vapor flow and solids mixing.

In one or more embodiments, said flights have a repeated portion removed which promotes vapor flow to an exit port and promotes solids mixing.

In one or more embodiments, said flights are connected together without said shaft present.

In one or more embodiments, the flight is separated into a plurality of discontinuous flights whereby vapor can flow between discontinuous flights.

In one or more embodiments, said structures consists of rods attaching two or more flights.

In one or more embodiments, said structures consist of paddles attaching two or more flights.

In one or more embodiments, said structures promote mixing of the biomass and heat carrier.

In one or more embodiments, said structures promote screw rigidity.

In one or more embodiments, structures modify the natural frequency of the screw.

In one or more embodiments, the structures promoting rigidity to allow for screws longer than 5 feet to operate at elevated temperatures.

In one or more embodiments, said transfer screw is substantially smaller than the auger housing and said screw operates such that the distance from the bottom of the flights to the auger housing is less than the axial length of the particles to be conveyed.

In one or more embodiments, said transfer screw has continuously decreasing distance between flights whereby the biomass material is compressed and the pressure in the biomass and its thermal decomposition products increases.

In one or more embodiments, the portion of the flight(s) located in the zone where solid particles are introduced into the auger extend such that the gap from the tip of the flight at its lowest position to the auger housing is greater than the axial length of the particle which is introduced into the auger reactor.

According to further embodiments of the above method and system, a temperature and a pressure within an auger reactor are selectively controllable. In one implementation, a temperature within a second auger reactor in the series is incrementally higher than a temperature within a first auger reactor in the series, and wherein a temperature within a third auger reactor in the series is incrementally higher than a temperature within the second auger reactor. In addition, a pressure within the second auger reactor is incrementally higher than a pressure within the first auger reactor, and wherein a pressure within the third auger reactor is incrementally lower than a pressure within the second auger reactor. In some embodiments $T_2$ may be greater than $T_1$, $P_2$ may be less than $P_1$, and $T_1$, may differ than $T_1$. The pressure may be created by the vapors or by physical compression of the solids by means of changing diameter of the shaft of the auger screw or by varying the linear distance between flights. In some embodiments, a dimension of each auger reactor is adjustable depending on the residence time for the biomass and vapors at each auger reactor. It will be appreciated by one skilled in the art that the solid residence time can be varied based on the rotation speed of the auger.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
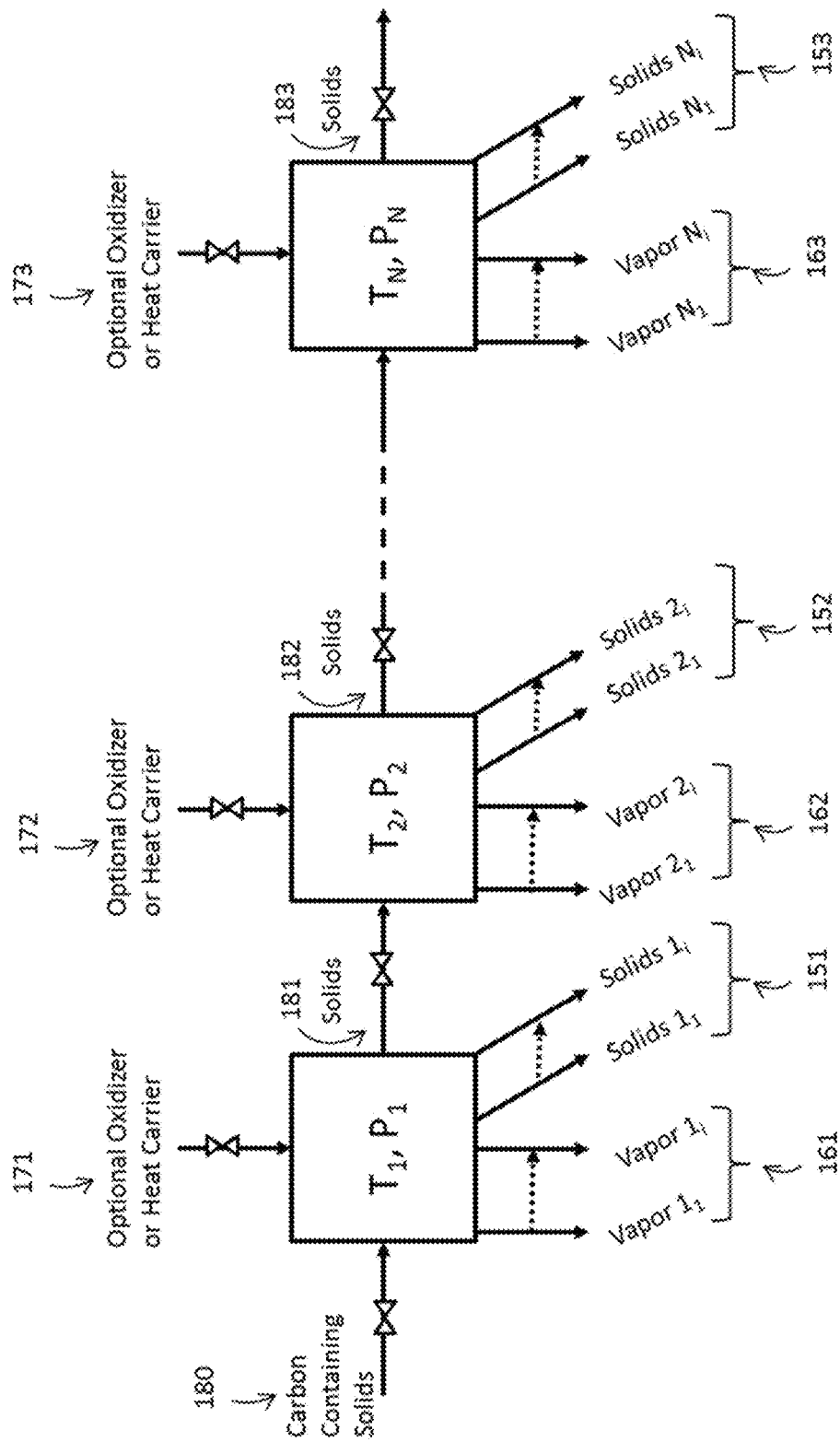
FIG. 1 is a flow diagram illustrating incorporating one to i stream of solids and vapors at N different stations according to one or more embodiments.

It should be understood that the invention can be practiced with modification and alteration, and that the invention be limited only by the claims and the equivalents thereof.

DETAILED DESCRIPTION

The following diagrams and description present examples of the invention, but in no way, limit the application of the above concepts. The following designs are simply illustrative of their application. Unless specifically defined otherwise, all technical or scientific terms used herein have the same meaning as commonly understood by one possessing ordinary skill in the art.

As used herein, the term 'biomass' includes any material derived or readily obtained from plant or animal sources. Such material can include without limitation: (i) plant products such as bark, leaves, tree branches, tree stumps, hardwood chips, softwood chips, grape pumice, sugarcane bagasse, switchgrass; and (ii) pellet material such as grass, wood and hay pellets, crop products such as corn, wheat and kenaf. This term may also include seeds such as vegetable seeds, sunflower seeds, fruit seeds, and legume seeds. The term 'biomass' can also include: (i) waste products including animal manure such as poultry derived waste; (ii) commercial or recycled material including plastic, paper, paper pulp, cardboard, sawdust, timber residue, wood shavings and cloth; (iii) municipal waste including sewage waste; (iv) agricultural waste such as coconut shells, pecan shells, almond shells, coffee grounds; and (v) agricultural feed products such as rice straw, wheat straw, rice hulls, corn stover, corn straw, and corn cobs.

As used herein the term "bio-oil" means any liquid oxygenated hydrocarbon fuel thermally quenched from the pyrolysis vapors of a biological substrate including, without limitation, an oil containing the elements carbon, hydrogen, or oxygen, and which may be referred to in the art as a "bio-crude" and/or a "pyrolysis oil".

The term "vapor", as used herein, means a phase of a substance including a liquid-vapor mixture, saturated vapor, superheated vapor or vapor/gas mixture. It is appreciated that vapor will include both the condensable portions as well as the light gases due to the difficulty of separation.

The term "gas", as used herein, means a phase of a substance including an ideal gas, real gas, gas mixtures, or a gas/vapor mixture. It is appreciated that a gas may include a condensable component as well as the light gases due to the difficulty of separation.

The term "shaft", as used herein, means the center structure of the transfer screw to which the flights are attached.

The term "flights", as used herein, means the structures attached to center shaft of the auger screw which have the primary function to move material through the auger.

The term "biochar", as used herein, means the solid carbonaceous material produced after pyrolysis of biomass.

Biochar may have a plurality of uses including but not limited to a soil amendment, combustion feedstock, or means for sequestering carbon.

The term "fuel", as used herein, means liquid hydrocarbons that may be used as an energy source. Fuel as a liquid hydrocarbon may have a plurality of uses including transportation fuel, fuel for stationary internal combustion engines, and other such purposes common in the world.

Methods and systems are described for which carbon containing material such as biomass are processed to produce a plurality of product streams that may have one or more beneficial characteristics. It is appreciated that any methods or materials similar or equivalent to those described herein can be used in the practice or deployment of the present invention.

The method and system provides pyrolysis of carbon containing material such as biomass by heating and thermally decomposing the carbon-containing material in one or more stages such that one or more vapor streams and one or more solid streams are produced each with beneficial characteristics. Conditions in each stage can be tailored to optimize products for further processing.

FIG. 1 illustrates one embodiment in which carbon-containing input material 180 is converted to beneficial vapors 161, 162, and/or 163 in one or more stages. Each stage may operate independently with respect to the other stages, and for example, the temperature and pressure can be independently controlled at each stage. Carbon containing material 180, such as biomass, is introduced into the system. Optional heat carrier and/or oxidizer 171, 172 and/or 173 can be introduced at their respective stages. Product vapor stream(s) 161, 162, and/or 163 and solid stream(s) 151, 152, and 153 may be produced. Exit solid stream 181 and 182 is conveyed from the exit of each station to the input of the next stage. FIG. 1 further illustrates where station N has one or more vapor product streams 161, 162, and/or 163. FIG. 1 further illustrates the method where one or more solid stream(s) 151, 152, and/or 153 may be removed from each station where said solid stream has beneficial characteristics. In certain embodiments, a station will have one vapor stream and a solid stream that is passed to the next station until the last station where a solid is withdrawn. It is contemplated however that more than one vapor, e.g., vapor $1_1$ ... vapor $1_i$, or more than one solid stream, e.g., solid $1_1$ ... solid $1_j$, can be removed from multiple locations within the station. To be part of a given vapor stream or solid collection, the collected materials experience same processing conditions. That is, the processing conditions within a stage are substantially the same.

In certain embodiments, the method and system provide a vapor stream for catalytic conversion into fuel that results in increased catalyst life without compromise to the efficiency of fuel production.

One of the beneficial characteristics of the method and process is increased catalyst life. Catalyst deactivation occurs in different modes. One of the modes is a reversible process called coking. By optimizing vapors to have beneficial characteristics, the amount of product that can be made per unit of coke formed and/or the amount of time that a catalyst operates before deactivation by coking can be increased.

In certain embodiments, the method and system provide a vapor stream that reduces coking in the downstream catalytic conversion into fuel. Processing stages are operated to pretreat a biomass to remove components that are harmful to the catalyst or non-productive in fuel production before the biomass is fractionated to generate a fuel producing vapor stream. For example, acetic acid is a source of coke with little fuel yield. In certain embodiments, a first stage can be operated under conditions that favor the release of acetic acid from the biomass, without significant degradation into pyrolysis gases useful for fuel production. By way of example, the auger is heated externally such that the internal temperature is 250° C. (480° F.) and the pressure is at atmospheric. The vapor product is primarily water and acetic acid, which is removed from the processing stream and diverted from entering the catalyst where it supports coking In another embodiment, the system and method is designed to improve the yield of the biofractionation process. For example, the pressure I processing stages as the biomass is advanced through the biofractionation process can be reduced. The lower pressure helps to volatilize the higher molecular weight components of the solid stream.

In certain embodiments, the method and system provide a biochar product that can be optimized for use as a soil amendment or carbon sequestration. Processing conditions that optimize the vapor stream composition for catalytic conversion into fuel can produce a solid stream that is not optimal for soil amendment or carbon sequestration. For example, the solid stream contains hydrocarbon products that are not sufficiently inert to sequester carbon and/or the solid stream composition lacks the desired features, e.g., pore sizes, free of hydrocarbon contamination, that are desired in soil amendment.

According to one or more embodiments, biomass can be processed in a processing station (optionally after processing to remove an acetic acid-rich vapor stream) to produce a vapor stream suitable for conversion into biofuel. Vapor streams rich in one or more of various compounds, including but not limited to: (i) long chain dehydrated sugars; (ii) lignin derived aromatics; (iii) lipid based oils; (iv) carbohydrate based furans can be considered suitable for conversion into biofuel. The resultant solid stream can be further processed at a subsequent processing station to generate a solid stream that can be used for soil amendment or carbon sequestration. The vapor stream (which may not be suitable for fuel production due to low content of fuel-producing components or high content of coke-producing components) can be diverted for other uses (such as for heat or energy production, e.g., by combustion).

In certain embodiments, the method and system provide both a vapor stream that reduces coking in the downstream catalytic conversion into fuel and a biochar product that can be optimized for use as a soil amendment or carbon sequestration.

In certain embodiments, only vapor streams having a composition optimized for fuel production are used in a downstream catalytic conversion process, while the remaining vapors are directed to uses other than fuel production. For example, the vapor streams having compositions that are sub-optimal for fuel conversions as identified and described herein can be used for energy production, such as in a combustion process for the generation of steam.

Conventional methods for pyrolyzing carbon-containing material may be used in the multistage method and system described herein. By way of example, fluidized bed reactors, tube furnaces and ablative pyrolyzers may be adapted for use according to one or more embodiments. A biomass fractionator, such as that described in U.S. Pat. No. 8,216,430, assigned to Cool Planet Energy Systems, Inc., which details the placement of biomass in thin sheets in compartments and subjects the biomass to controllable pyrolysis conditions, also may be used.

In one embodiment, the pyrolysis processing stations include one or more rotating screw augers or rotating kilns (herein referred to as auger). The auger system pyrolyzes carbon containing material such as biomass to produce the final product and intermediate streams with the beneficial characteristics. These beneficial characteristics for the intermediate streams may include reduced coking in a catalytic process as compared to one stage pyrolysis followed by a catalytic process. The beneficial characteristics may also include solids production tailored through the stages to be optimized for biochar as a soil amendment. Auger technology relies on mechanical movement of the solids through the reaction zone. This characteristic means that the auger can be operated across a wide range of temperatures, pressures, and residence times of the solids. Tuning the conditions to produce an optimal vapor for fuel yield is practical when an auger is selected.

Figure 2:
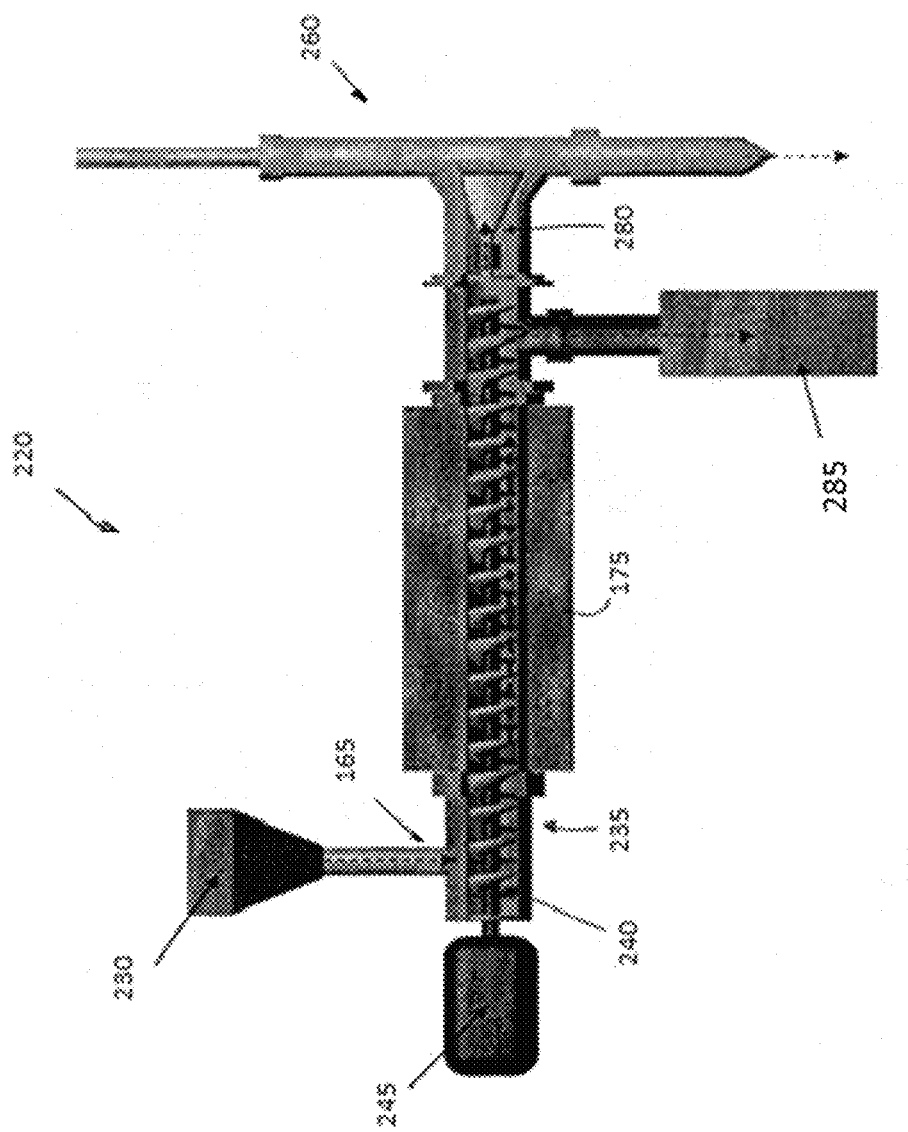
FIG. 2 is a sectional view illustrating a biomass fractionation system incorporating an auger reactor according to one or more embodiments.
Figure 3:
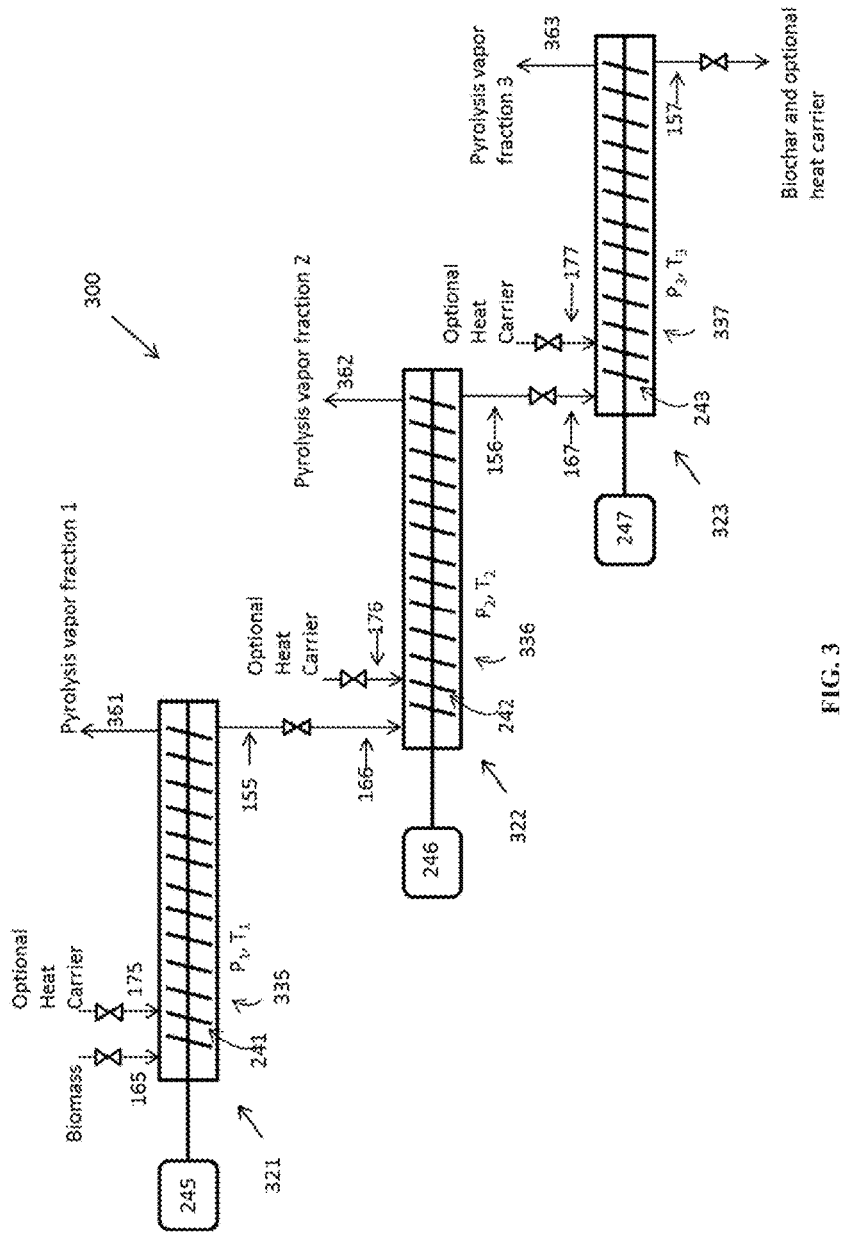
FIG. 3 is a diagram illustrating a biomass fractioning system comprising a plurality of biomass stations configured in series, in accordance with one or more embodiments.

FIG. 2 illustrates a carbon containing fractioning system comprising a single auger reactor 220. The auger reactor 220 can be used alone with novel features outlined below, or as part of a plurality of auger reactors 220 in series, as illustrated by FIG. 3. When used to provide a plurality of processing stations, the single auger may have a plurality of temperature stations contained within the auger. The auger reactor(s) can be employed to carry out any of the fractioning and/or pyrolyzing processes set forth herein. In the illustrated embodiment of FIG. 2, auger reactor 220 comprises a feeder 230 for receiving biomass, auger 235 for receiving the biomass from feeder 230 and including a transfer screw 240 for conveying the biomass, a motor 245 for driving the transfer screw 240, an exit port 255, and a condenser 260. Auger reactor 220 can include a heater 175 for heating the biomass as it is conveyed through auger 235. In some embodiments, the heater 175 can include one or more heating components. In other embodiments, auger reactor 220 can heat the biomass by way of hot transfer fluid passing through the auger 235. The heat maybe varied along the auger to create multiple stages for fractionation. In further embodiments, the transfer screw 240 can itself be heated. In another embodiment, hot sand is passed through the auger 235 during operation, thereby heating the biomass.

With further reference to FIG. 2, transfer screw 240 is mounted to rotate inside the auger 235, and is driven by associated external motor 245. The auger 235 has an inlet 165 connected to feeder 230. In operation, biomass is loaded into the feeder 230, which feeds the biomass into auger 235 by way of inlet 165. Transfer screw 240 conveys the biomass at a constant and regulated speed through the auger 235. The biomass is subjected to heat resulting in its decomposition during transport through the auger. This decomposition creates both sequesterable carbon in the form of biochars 285 and a pyrolysis vapor stream 260.

Auger reactor 220 may comprise a shaft with one or more flight(s) attached. In combination, the shaft and attached flight(s) constitute a transfer screw 240. The transfer screw rotates relative to a housing 235 that encloses the screw and said housing is substantially gas tight. The rotation may be accomplished by any mechanical driver 245 such as but not limited to electrical motor, engine, gas turbine, or any other suitable mechanical means. The rotation of the transfer screw relative to housing transports the carbon containing material through the reaction zone along the length of an auger.

In another embodiment, a series of flights may be joined together without a shaft and in said embodiment the flights alone constitute the transfer screw.

In another embodiment, said transfer screw and housing may be attached together and rotate together. In said embodiment the rotation of the screw and housing with respect to the earth transports the carbon containing material through the reaction zone along the length of an auger.

The auger reactor described in FIG. 2 may be used as a single stage in a multistage system, as is described in greater detail below.

In other embodiments, the auger reactor may be capable of establishing different temperatures in different regions along the auger screw length so that different stages are incorporated into the single reactor. The independent temperature control can be obtained by introducing a different temperature/heating medium in the zones. The vapors are withdrawn in such a manner as to preferentially only withdraw vapors from that sections.

Figure 10:
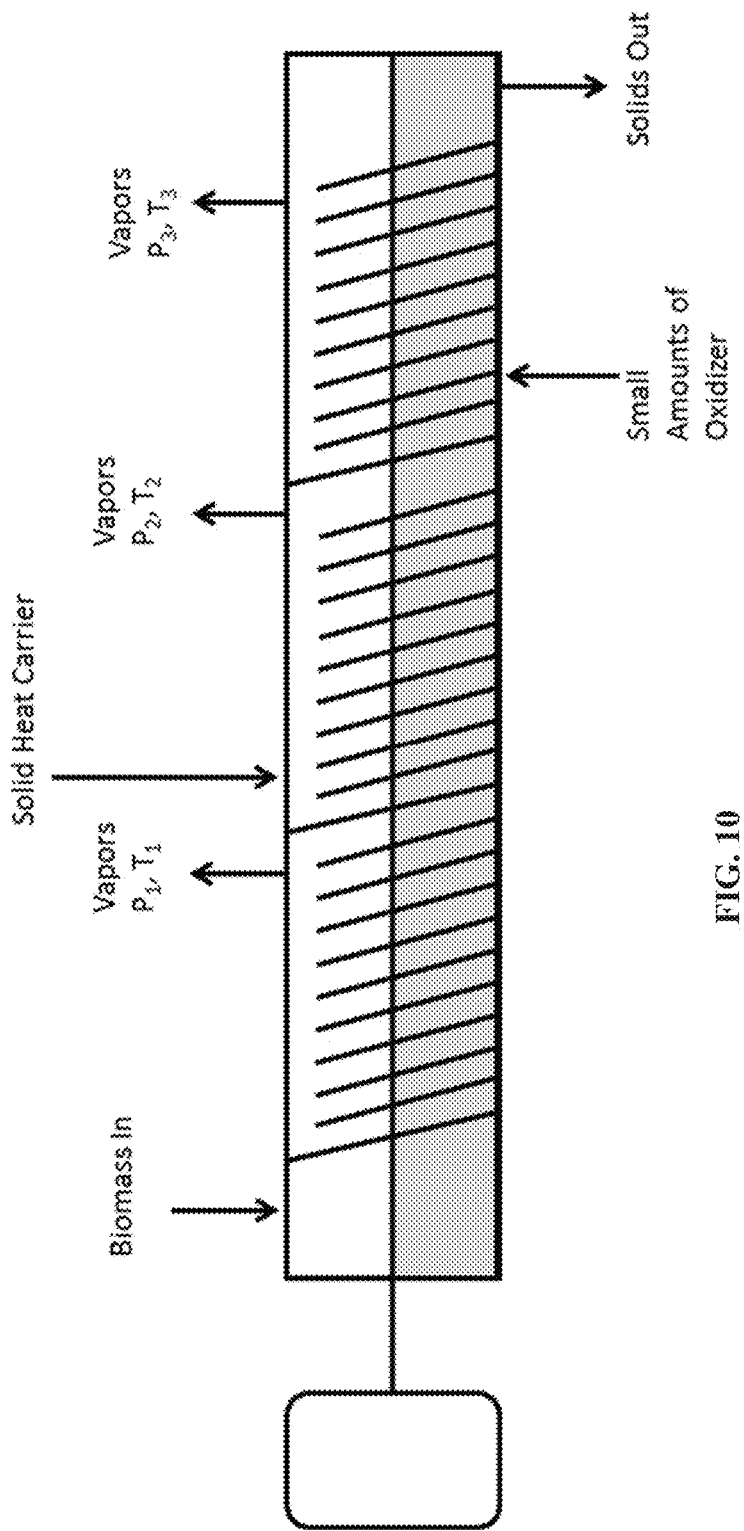
FIG. 10 is a schematic illustration of a single auger system used to provide multiple processing stations according to one or more embodiments.

In one exemplary embodiment shown in FIG. 10, the auger transfer screw includes sections wherein the flights on the screw are not notched and hence segment the auger into stations. Where P1 is very close in magnitude to P2 and P3 but the temperatures may increase along the length of the reactor. In this figure the whole thing might be jacketed which provides the heat for zone one and active insulation for the second and third zones. Note that a change in flight design creates the zones which are not perfectly isolated from the vapors of the other zones but are substantially isolated because the vapors would have to flow down through the bed of char rather than take the easier route out of the vent. The crossover of a small fraction of vapors is not of big concern as long as the streams are substantially isolated. This embodiment is not the current preferred design.

Further considering FIG. 2, a condenser 260 may be attached to the vapor outlet(s) 160 and said condenser comprises a vertical condenser having its inlet connected to auger outlet 280. The condenser 260 is configured to condense fractions of a portion of the pyrolysis gas stream. These condensable fractions may contribute to catalyst deactivation by coking and it is beneficial to partially separate said fractions. Gas stream extraction of one or more volatile components can be performed while maintaining the temperature of the gas until it reaches the vertical condenser 260. Biochar is recovered from exit port 285, or if the auger is to be used as one of a series of stages in the pyrolysis process, exit port 285 can lead to a next stage in the system.

In one or more embodiments, the partial condensation can be used to remove suboptimal fractions. The sub optimal fractions captured in the condenser can be directed to a combustion process. Removal of suboptimal portions of the vapor stream allow the catalyst to last longer.

FIG. 3 is a diagram illustrating a biomass fractioning system 300 for pyrolyzing biomass comprising a plurality of biomass processing stations 321, 322, 323 configured in series following the method described in FIG. 1. Each of these stations 321, 322, 323 can comprise an auger reactor 335, 336, and/or 337, such as described by FIG. 2. In particular, each station 321, 322, 323 may comprise an auger 335, 336, 337 including auger inlet 165, 166, and 167 for receiving biomass (or an intermediate thermal decomposition product thereof), a transfer screw 241, 242, 243 for conveying the biomass through the auger reactor, a motor 245, 246, 247 for driving the transfer screw 241, 242, 243, and an exit port 155, 156, 157 for removing the pyrolysis produce, e.g., biochar, from the auger reactor. Auger 235, 236, and/or 237 can include an optional heat carrier 175, 176, and/or 177 for heating the biomass as it is conveyed through auger 235, 236, and/or 237. Each stage includes an exit port for release of vapor stream 361, 362, 363 generated during use. In this figure the vapors are separated such that the unwanted molecules are mostly in a vapor fraction different than the one sent to the main fuel column.

Each biomass station 321, 322, 323 represents a stage in the biomass pyrolysis process. The first stage terminates when a remaining biomass product exits station 321, and the second stage begins when this product enters the second station 322 at auger inlet 165. Each biomass fractionation station may be substantially isolated via mechanical/physical means such as but not limited to a valve system that allows for the intermittent or continuous transfer of solid material to the next auger in the series while restricting vapor transfer between auger stations. The final stage at the last station (i.e., station 323 in the illustrated embodiment) terminates when a biochar product exits via exit port 157. Although the illustrated embodiment features three biomass processing stations, any number of biomass processing stations can be employed without departing from the scope of the invention.

With continued reference to FIG. 3, heat carrier 175, 176, 177 can include one or more heating components for increasing the temperature within an auger 335. For example, heat carrier 175 can comprise heating coils within or surrounding the auger 335, or a hot transfer fluid or hot particles such as sand passing through the auger 335. In further embodiments, the transfer screw 241 can itself be heated. Each reactor stage is capable of independent temperature control. In some embodiments, the heat carrier 175, 176, 177 is the same across all stages. In other embodiments, the heat carrier 175, 176, 177 varies across the stages. For example, in one embodiment, the heat carrier 175, 176, 177 comprises heating coils plus hot gas in the first stage (station 321), yet comprises a hot transfer fluid external jacket plus heated steel spheres in the second and third stages (stations 322 and 323).

Because each biomass fractionation station may be substantially isolated, for example by using a valve system, the pressure in each auger reactor can be independently controlled. The pressure is created by the generation of pyrolysis vapors and by introducing gases/vapors from a compressor. The pressure is controlled by the outlet valve which provides the back pressure necessary to have a pressure in a stage. The control is by the rate at which vapors are removed from the system.

In some embodiments, the temperature T and pressure P within an auger 335, 336, 337 is controllable such that it can be varied in each successive auger station 321, 322, 323. In one exemplary embodiment, the temperature rises in each successive auger station 321, 322, 323 to an incrementally higher temperature T1, T2, T3 than the previous station. Each temperature stage is selected to drive off an appropriate vapor fraction from the biomass by way of vapor stream 361, 362, 363. At the same time, the pressure P1, P2, P3 drops across each successive auger station 321, 322, 323, thereby facilitating volatilization of heavier components near the end of the pyrolysis stage. The temperature and pressure profile of the system may therefore utilized to produce product streams with desirable characteristics.

In another embodiment of the invention one or more of the individual auger reactors may employ a temperature profile along the length of the auger. The temperature profile may vary along the length of the reactor. This is by either increasing the temperature of the external electrical heating or by adding solid heat carrier at different inlets along the length. The temperature may also vary by introduction of an oxidizer at some point within the stage.

Figure 11:
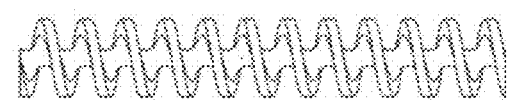
FIG. 11 is an illustration of various auger screw designs that can be employed according to one or more embodiments.
Figure 11:
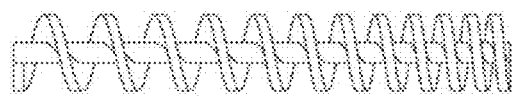
Figure 11:

In yet another embodiment, one or more of the individual auger stations may employ a pressure profile across the length of the auger. A pressure profile may be employed through screw design wherein the changing diameter of the screw or distance between the flights increases the pressure on the biomass as it is forced through the system. Exemplary screw designs that provide increasing pressure are shown in FIG. 11. Thus, the screw may use a decreasing flight pitch or an increasing shaft diameter to increase pressure on the biomass within a processing station. A pressure profile also means different stages are at different pressures.

Still referring to FIG. 3, the dimensions of each stage can be adjusted to allow more or less residence time at a particular station. In particular, the length of the auger 335, 336, 337 at each station 321, 322, 323 can be increased for a longer residence time, or decreased for a shorter residence time. In the illustrated embodiment, each auger 335, 336, 337 is depicted as having the same dimensions, and therefore similar vapor residence times. In further embodiments, the length of one or more augers 335, 336, 337 is varied to achieve a desired residence time at each station.

The pyrolysis vapor fractions produced in the various auger stages can comprise commercially viable bio-intermediary compounds. By way of example, various temperature stages can be utilized to extract various compounds, including but not limited to: (i) long chain dehydrated sugars; (ii) lignin derived aromatics; (iii) lipid based oils; (iv) carbohydrate based furans; (v) shorter hydrocarbons; (vi) oxygenates such as butane, butanol, acetone, acetic acid, acetylaldehyde, aldehyde, methane, methanol, etc.; and (vii) ultimate syngas components (hydrogen, carbon monoxide, and carbon dioxide). At each successive processing stage, a station may be heated to a higher temperature via the various heating schemes detailed above and/or a higher pressure using the various schemes detailed above. In other embodiments, the pressure may vary (e.g., increase and decrease) as the solid stream advances through the process.

Figure 4:
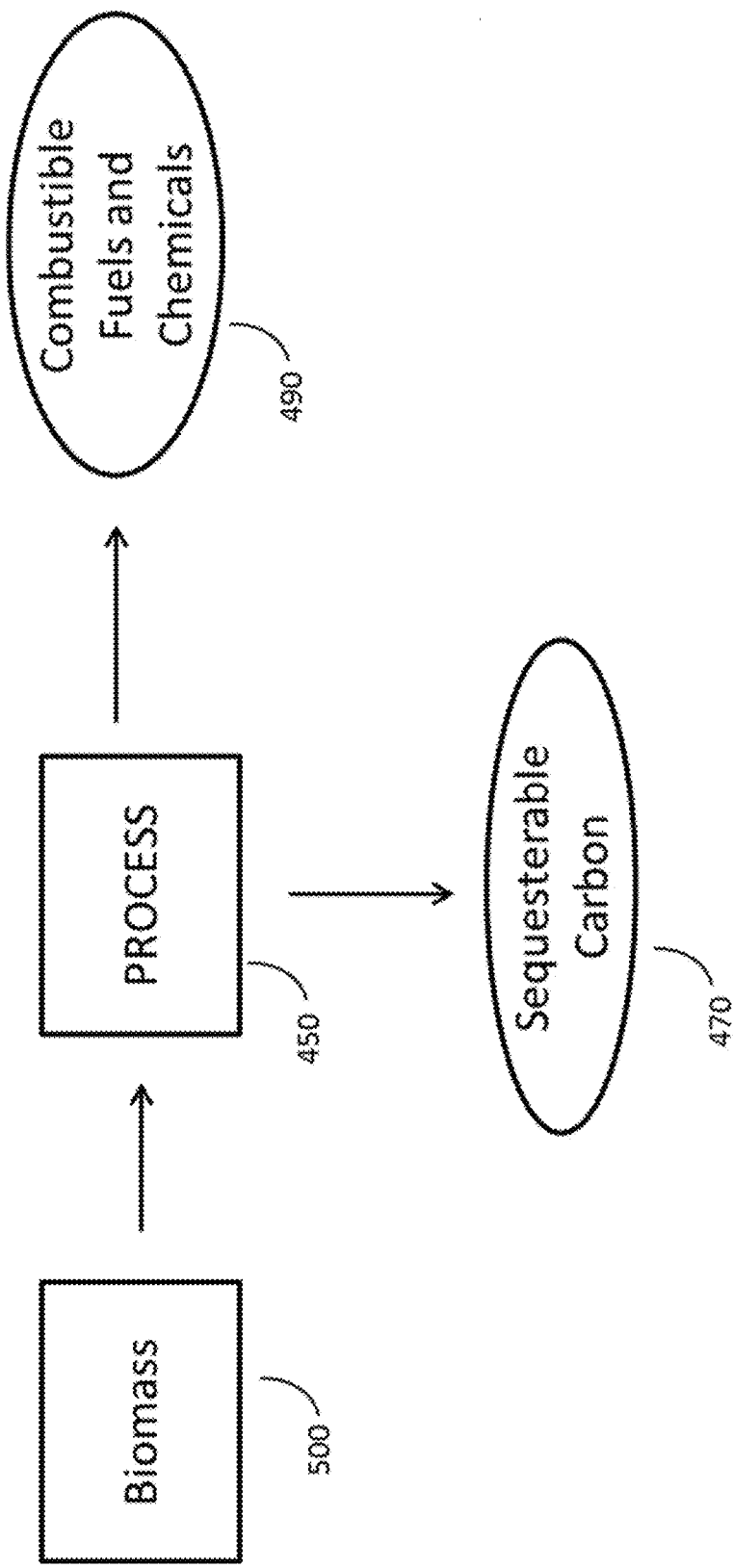
FIG. 4 is a flow diagram illustrating an embodiment of the invention in which the carbon-containing input comprises biomass, in accordance with an embodiment of the invention.

FIG. 4 is a flow diagram illustrating a method of making reduced or negative carbon fuel in accordance with an embodiment of the invention. The process may be performed by a biomass fractioning method and system including those described by FIGS. 1, 2, and 3. According to the method, a carbon-containing input 400 is processed in process 450 to produce combustible fuels and chemicals 490 and sequesterable carbon 470. Combustible fuels and chemicals 490 can be negative carbon and can include, but are not limited to, gasoline, gasoline-components, jet fuel, diesel, naphtha, oxygenate fuels such as methanol and dimethyl ether, hydrogen, methane, light gas oil, and vacuum gas oil. Process 450 refers to any sequence of stages that convert the carbon-containing input 400 into outputs 490 and 470 as separate entities. These processes can include, but are not limited to, a biofractionation process which thermo-chemically converts the input at increasing temperatures under pressure. Sequesterable carbon 470 refers to any carbon that is stored for long periods of time, including carbon that is stored underground or used as a soil amendment.

In certain embodiments, the carbon-containing input can be biomass. Biomass is fed as input into process 450, which concurrently outputs combustible fuel and chemicals 490 and sequesterable carbon 470 as substantially uncontaminated and separate entities.

In some embodiments, biomass is the carbon-containing input and biofractionation is the process which produces reduced or negative carbon fuel. This process subjects the biomass to decomposition by way of a heat source. In some embodiments, the biomass is subjected to temperature ramps under pressure shocks, as is described in co-owned U.S. Pat. No. 8,216,430 and U.S. Pat. No. 8,367,881, the contents of which are incorporated herein by reference in their entireties. Biomass is inputted into the biofractionation process to produce combustible fuels and chemicals 490 and sequesterable carbon 470. In other embodiments, the biofractionation process will comprise the auger system described herein.

Figure 5:
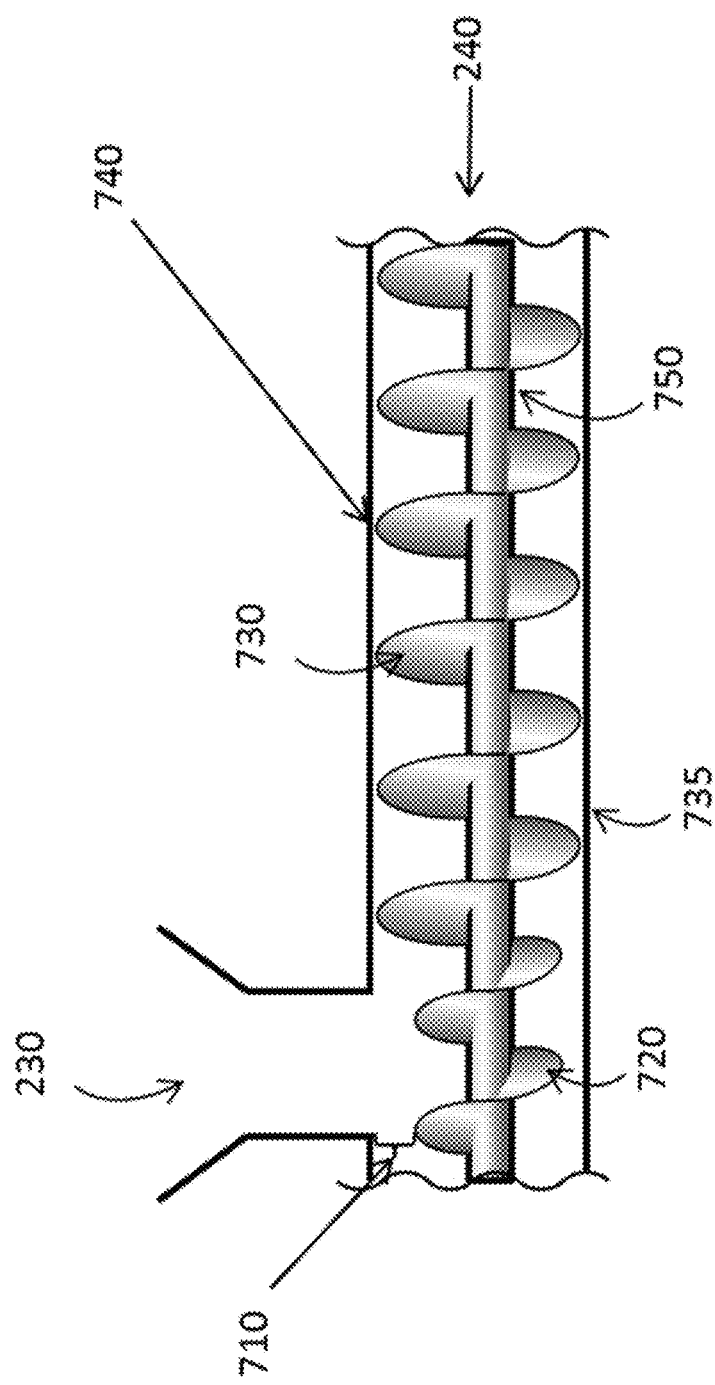
FIG. 5 is an illustration the step in the auger screw flights in the inlet region of the solid feed according to one or more embodiments.

In other aspects of the invention, a modified auger system is provided that improves the feeding and transport of biomass through the auger reactor. Certain carbon feeds and heat carriers are rigid or non-breakable and it is possible for the feeder entrance to clog or jam as the particles are fed from a hopper into the narrow opening in the auger reactor. In one aspect, the auger reactor screw is modified to facilitate the introduction of material into the reactor system and to reduce jamming. The auger system may include a specifically designed "step", shown in FIG. 5, at the location where solids and/or heat carrier are introduced into any of the one or more auger reactors. The step includes a series of flights 720 that extend radially from the shaft a distance r' (indicated by arrow 725 in FIG. 5). The distance r' for the flight features 720 located proximate to the material feeder 230 is less than a distance r" (indicated by arrow 745 in FIG. 5) that defines the distance from the auger shaft 755 to the reactor wall 735. The distance r' is selected to provide a gap 730 from end or tip of the flight to the auger housing 735. The gap can be greater than the axial length of the solid non-breakable particles which are introduced into the auger reactor. The flights that exhibit this characteristic are those in the section(s) where solids material is introduced into the auger as seen in FIG. 5. The gap 740 for the flights 730 not in the region of solid entrance 230 may be smaller than the axial length of said solid non-breakable particles.

The step illustrated in FIG. 5 is advantageous for embodiments of the invention where solid non-breakable particles may be fed to the auger. The solid non-breakable particles can easily become trapped between the flights and the auger housing and inhibit or stop the movement of the screw relative to the housing. The step allows for the easy passage of non-breakable particles and reduces feedstock attrition. In addition the step reduces the initial attrition where particles of feedstock become trapped between the flights and the auger housing and are broken up by the force of the screw drive.

Figure 6B:
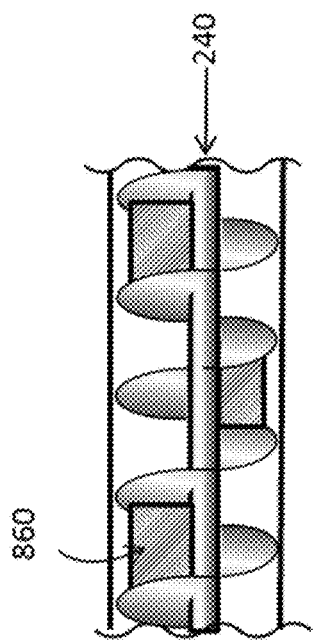
FIGS. 6A and 6B are illustrative example auger screw flights connecting structures, in accordance one or more embodiments.
Figure 6A:
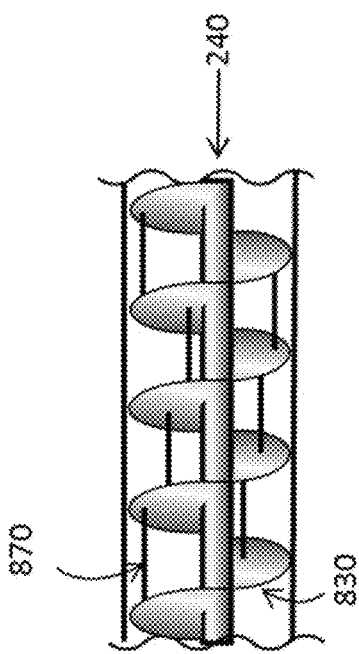
Figure 7C:
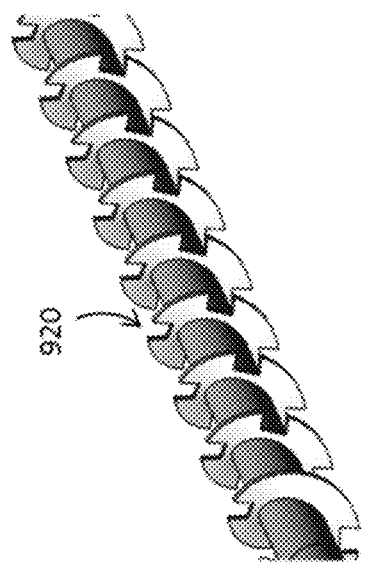
FIGS. 7A, 7B, and 7C illustrates flight designs that promote vapor flow and solids mixing, in accordance one or more embodiments.
Figure 7B:
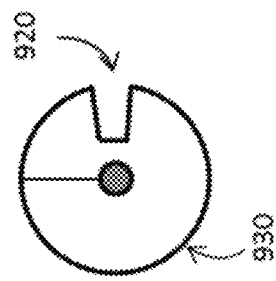
Figure 7A:
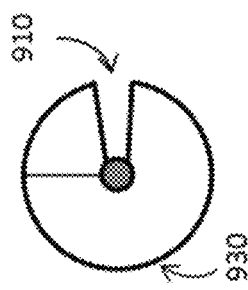

FIG. 6 illustrates yet another embodiment of the auger screw having a modified screw structure. Screw structures 860 and 870 connect to two adjacent flights 830 of the screw. FIG. 6 illustrates two (2) versions of these structures, a paddle 860 and a rod 870. As evident from FIG. 6, the structures span the distance between flights and may be in any number of configurations and orientations. These structures promote mixing of solids. A separate function of these structures is to promote screw rigidity. Yet another separate function of these structures is to change the natural frequency of the screw. Hence the structures may be used for any combination of solids mixing, screw rigidity, and modification of the natural frequency of the screw. It will be appreciated by one skilled in the art that for long screws the additional rigidity provided by the structures will decrease deflection of the screw. It will also be appreciated by one skilled in the art that various components of the system such as the motor operate with a certain frequency which can be transmitted to the screw. The structures can modify the natural frequency. It will also be appreciated by one ordinarily skilled in the art that said structures will promote mixing as the screw is rotated In yet another embodiment of the invention the flights 930 may exhibit a design feature 920 in which a portion of the flight is removed as seen in FIG. 7 to form smaller 'fins' that precesses along the edge of the screw flights. The removed portion may extend from the edge of the flight furthest from the shaft to the shaft to create a notch 910. FIG. 7A is a view along the screw shaft illustrating this embodiment. In other embodiments, the removed portion may extend only a fraction of the total distance from the edge of the flight to the shaft to create notch 920. FIG. 7B is a view along the screw shaft illustrating this embodiment. The feature maybe periodically repeated along the flight edge as seen in FIG. 7C. Notch features 910 or 920 promote mixing of material and also allows for vapors produced to flow more easily toward exit ports in auger housing.

In yet another embodiment the flights are not continuous but broken into a plurality of flights distributed along the length of the shaft.

Figure 8B:
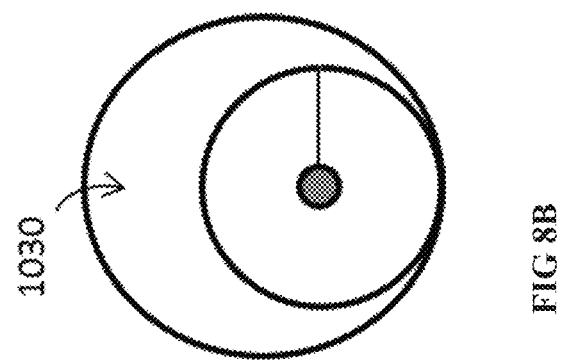
FIGS. 8A and 8B illustrate a screw design that promotes vapor flow and a feature to improve reliability of solids handling.
Figure 8A:
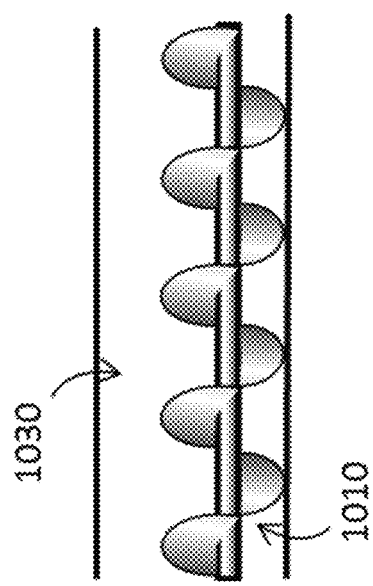

In yet another embodiment seen in FIG. 8, the screw 1010 may be substantially smaller than the auger housing leaving a gap 1030 above the screw. In this embodiment the screw would nominally operate such that the distance from the bottom of the flights to the auger housing is less than the axial length of the particles to be conveyed. Said embodiment allows for vapor flow above the auger to the one or more exit ports in the auger housing. Due to the clearance space generated in this configuration, the vertical position of the screw can be adjusted for a plurality of reasons including but not limited to clearing of particle jams, operation with larger particles or maintenance. See, FIGS. 8A and 8B.

Figure 9B:
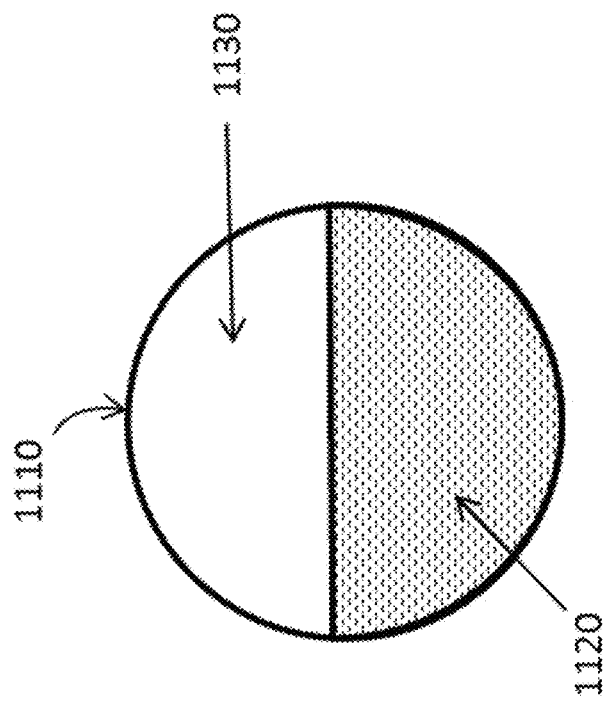
FIGS. 9A and 9B illustrate a heat carrier design with a shell material that differs from the internal material, and demonstrating that the internal material initially may occupy part or all of the internal space.
Figure 9A:
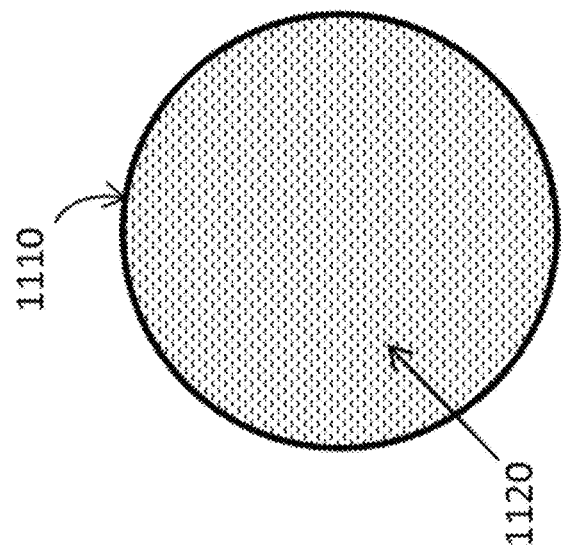

FIGS. 9A and 9B illustrate two embodiments of a novel heat carrier for pyrolysis reactions. Said heat carrier consists of a hollow particle constructed of a metal or ceramic which comprises the shell 1110 and containing a material 1120 different than the shell such that the internal material can be heated to change phases and whereby heat may be transferred to a thermal conversion process by the appropriate phase change of the internal material. The internal phase change material may fill completely as shown in FIG. 9A or partially as shown in FIG. 9B the volume within the shell while in the solid or liquid phase. The void space 1130 may be filled with gas as necessary. The phase change material 1120 may be a metal or a salt. The selection of the phase change material depends on the process temperatures desired. Some example phase change materials are: Zinc, Aluminum, Sulfur, Potassium, Lithium Fluoride, Sodium Chloride, Calcium Carbonate, Calcium Chloride, Calcium Hydroxide, Zinc Chloride. For example sodium metal vaporizes at 883° C. (1621° F.) at 1 bar. The phase change of sodium from vapor to solid can therefore be used to provide process heat for the pyrolysis of biomass.

EXAMPLE 1

In a series of experimental tests the staged pyrolysis benefits were tested by varying the generation temperature of the second stage vapors. Example 1 models a two stage process, in which the first stage is conducted under varying conditions to make vapors for fuel. These vapors were then directed to a catalytic process to produce fuel and several key indicators were observed. The second stage could be conducted under conditions to convert the solid stream into a biochar for soil amendment. The reaction conditions for the first stage were varied and the effect of the reaction conditions on catalyst lifetime and coke production were evaluated.

Coke yield and relative catalyst life is reported in Table 1. The table is normalized to generic mass units per hour and temperature is controlled by varying the electric heaters used in the experiment. The measured catalyst life is also normalized against "x" amount of time that fuel is produced without significant reactant breakthrough. As can be seen in Table 1, for the same feed rate, the relative life of the catalyst changes as the temperature of the station is changed. Another key metric, fuel produced to coke produced, also changes favoring more fuel production relative to coke formation. It is of note that in run B, despite the introduction of only half the mass units per hour, the catalyst deactivated in less time than run D which introduced biomass at a higher rate. Also of note, run B and C which constituted higher temperature experiments also reported the shortest time to deactivation. A similar concept can be seen for the coke yield.

TABLE 1

Experimental Comparison of Catalyst Life and Coke Production as a Result of Stage Conditions

| | Biomass Rate to Pyrolysis | Final Temperature of Vapors sent to Catalytic Process | Coke Yield | Relative Catalyst Life |
|---|---|---|---|---|
| A | 1.5 mass units/hr | 376° C. | 3.8% | 3x |
| B | 0.7 mass units/hr | 395° C. | 8.8% | 2.5x |
| C | 1.4 mass units/hr | 409° C. | 8.4% | 1.5x |
| D | 1.5 mass units/hr | 382° C. | 4.9% | 3.5x |
| E | 1.3 mass units/hr | 376° C. | 4.3% | 3x |
| F | 1.5 mass units/hr | 380° C. | Not Measured | 4x |

The resulting char from the first stage was not suitable for soil amendment and in a second stage this char can be processed to 500° C. to make it more suitable for processing as a biochar soil amendment.

EXAMPLE 2

This examples illustrates a three step system where the first step produces vapors not suitable for fuel product and the second step vapors are used to make fuel. The third step is to make biochar for soil amendment. This example also shows the different use of heating methods and how pressure can be higher in the second stage (compressor).

Referring to FIG. 3, biomass, pine chips, is fed into the feeding system at point 165 and introduced into the first auger. The auger is heated externally such that the internal temperature is 160° C. (320° F.) and the pressure is at atmospheric. The vapor product is primarily water and is withdrawn from port 361 on 321 and sent to a water treatment stage.

In this example the solids are also introduced into a second auger via a feeding system 166. Heated steel shot are fed through the feeding system at point 176 on 322 and introduced into the second auger. The second auger 322 operates at a pressure of 60 psig by the introduction of a mixed atmosphere of heated gases pressurized by a compressor. By a combination of external heating and the heated steel shot the now dried and slightly converted biomass is heated from temperature 160° C. to 400° C. (320° F. to 750° F.). This yields a blackened solid product and vapors that are primarily water and the more volatile hydrocarbon vapor products. These vapor volatile products are removed from 362 exit port(s) and sent to a catalytic process. The residual solids are then transferred to a third auger where final heating to 550° C. (1020° F.) is accomplished to produce a biochar for a soil amendment process.

In this example, the third auger operates at a near atmospheric pressure. In the third auger additional heating is provided by adding a small amount of oxidizer in the form of air to heat the biomass to a final temperature of 550° C. (1020° F.). These vapor products are different molecules compared to the products from the second auger. The vapor products are in the last stage are expected to include heavy large oxygenates and such. Vapor products are removed from ports 163 and sent to a combustion process where they are burned to generate additional energy as steam. The solids are removed and sent to a process to separate the steel shot from the resulting biochar.

Processing biomass as described in Example 2 diverts the vapor streams generated at the higher temperatures from the catalytic process, where the molecules reduce operation time of the catalyst. The vapors coming off the third stage are larger and clog the catalyst pores etc. Instead, the molecules may be used for a separate beneficial process, e.g., burned to generate additional energy as steam. In addition, the removal of the heavier volatile components from the solid stream provides a biochar that can be used for carbon sequestration or soil amendment.

EXAMPLE 3

This example shows a three step system in which the heating of the middle stage is accomplished using electricity through the shaft.

Referring again to FIG. 3, biomass such as pine chips are fed into the feeding system at point 165 and introduced into the first auger. The auger is heated externally such that the internal temperature is 250° C. (480° F.) and the pressure is at atmospheric. The vapor product is primarily water and acetic acid and is withdrawn from port 361 on 321 and sent to another process. There are several processes that might use the acetic acid, such as a neutralization process in a water treatment step. As noted previously, removal of acetic acid at this stage helps reduce coking during fuel production. This ensures that the vapor stream generated at the lower temperatures are not sent to the catalytic process where said acetic acid is known reduce operation time of the catalyst but rather said vapors may be used for a separate beneficial process.

Solids then are introduced into a second auger via a feeding system 166. The shaft of the auger is heated electrically. The second auger 322 operates at a pressure of 60 psig by the introduction of a mixed atmosphere of heated gases pressurized by a compressor. By a combination of external heating and the heated shaft the now dried and slightly converted biomass is heated from temperature 250° C. to 500° C. (480° F. to 930° F.). This yields a blackened solid product and vapors that are the more volatile hydrocarbon vapor products.

These vapor volatile products are removed from 362 exit port(s) and sent to a catalytic process to produce liquid transportation fuel molecules. These vapors were generated at higher temperatures than those of the second stage of example 2, which produces a vapor stream containing a larger content of more heavy oxygenates. The bulk of the molecules will be similar to those of the previous process, but the higher temperature means that there will be molecules with different hydrogen:carbon ratios and it is thought that there will be more larger molecules. The higher temperature does produce higher vapor yields. This selection among the various conditions to obtain a vapor stream with the particular composition is an aspect of the current invention. Control of the biomass through multiple stages of preselected pyrolysis conditions, e.g., temperature, dwell time and pressure, enables one to tune the process to get a desired vapor product (and subsequent solid product).

The residual solids are then transferred to a third auger where final heating via electricity to 525° C. (975° F.) is accomplished to produce a biochar for a soil amendment. In this example, the third auger operates at a near atmospheric pressure.

EXAMPLE 4

This example shows how stages might be contained within the same auger through staging the heat source and using flight design to partially or substantially isolate the different stages. In this example a single auger unit is operated with discrete zones of temperature.

The biomass is introduced initially at ambient temperature and is transported first through a zone of temperatures of 290° C. (555° F.). Here the biomass undergoes a series of initial reactions in which the product streams are rich in water and acetic acid. The biomass continues into a second zone where heated steel shot is introduced. The biomass and steel shot then enters the third zone where it is converted to a final solid product. The vapors generated in the third zone are withdrawn. The vapor exits are positions and the flights are designed such that the vapor products are substantially segmented according to the zone in which said vapors were generated.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

What is claimed is:

1. A method of thermally decomposing biomass in a plurality of pyrolysis stations to generate biofuel and biochar in separate streams comprising:
   operating each of the plurality of pyrolysis stations by adjusting temperature and/or pressure, wherein at least one of the temperature and pressure are different between stations;
   transferring said biomass and/or subsequent thermal decomposition products into and out of said plurality of pyrolysis stations, the plurality of pyrolysis stations comprising:
   a first pyrolysis station is operated under conditions selected to generate a vapor product comprising primarily water and acetic acid and directing the vapor product from the first pyrolysis station to a first location;
   at least a second pyrolysis station operated under conditions selected to pyrolyze said biomass or the subsequent thermal decomposition products to produce a second vapor stream suitable for fuel production, and directing said fuel-producing vapor stream without condensing to a second location comprising a catalytic column for conversion to fuel; and
   at least a third pyrolysis station operated under conditions selected to pyrolyze said incoming thermal decomposition products to produce a biochar and to provide a third vapor stream, and directing the third vapor stream to a third location different from the first and second locations.

2. The method of claim 1, wherein one or more stations comprises an auger.

3. The method of claim 1, that produces at least one solid biochar stream for soil amendment purposes.

4. The method of claim 1, wherein the first station is preceded by one or more stations for drying of biomass.

5. The method of claim 1, wherein renewable chemicals are synthesized from the third vapor stream.

6. The method of claim 1, wherein a temperature within a second station in the plurality of stations is incrementally higher than a temperature within a first station in the plurality of stations, and wherein a temperature within a third station in the plurality of stations is incrementally higher than a temperature within the second station.

7. The method of claim 1, wherein a pressure in a station is lower than the pressure within the preceding station.

8. The method of claim 2, wherein an auger can be oriented on a slant of 0° to 85° with respect to horizontal.

9. The method of claim 1, further comprising filters to remove heavy coke forming or particulate components from the second vapor stream, whereby catalyst coking rates are further decreased.

10. The method of claim 2, wherein a catalyst is introduced into at least one auger station together with the biomass or its decomposition products.

11. The method of claim 2, further comprising a heat carrier to provide the thermal energy for thermal decomposition of the biomass selected from the group: heating coils with or surrounding the at least one auger station, electrically heating within or surrounding the at least one auger station, heated particles passing through the at least one auger station, heated ferromagnetic solid particles, heated char particles, heated ash particles, and heated particles with a phase change material internal to the particle.

12. The method of claim 2, further comprising a heat carrier comprising a hollow particle constructed of a metal or ceramic which comprises a shell and containing an internal material different than the shell such that the internal material can be heated to change phases in a temperature range of 300° C. and 1000° C. and whereby heat can be transferred to pyrolyze the biomass by the appropriate phase change temperature of the internal material.

13. The method of claim 1, where an oxidizer is provided to a station to promote heating.

14. The method of claim 2, wherein at least one auger station comprises a transfer screw and the transfer screw is heated by electrical means.

15. The method of claim 11, wherein the heat carrier for each station is independent.

16. The method of claim 2, where the stages are contained within in a single auger shell.

17. The method of claim 2, wherein a first auger station in the plurality of auger stations includes an exit port that terminates in an auger inlet of the second auger station.

18. The method of claim 2, wherein a last auger station in the plurality of auger stations terminates in an exit port that removes a biochar product of the system.

19. The method of claim 2, wherein a pressure within an auger station is selectively controllable by restricting the rate that products are withdrawn from the auger station.

20. The method of claim 2, wherein a pressure within an auger station is selectively controllable by introducing a gas or vapor stream into the auger station.

21. The method of claim 2, comprising controlling the pressure by continuously varying screw shaft diameter in at least one auger station.

22. The method of claim 2, wherein the dimensions of each auger station are adjustable to allow more or less residence time for the biomass at each auger station.

23. The method of claim 2, wherein the temperature of each auger station comprises a linearly varying temperature.

24. The method of claim 1, wherein a pressure in the third station is higher than the pressure within the second station.

25. The method of claim 1, further comprising removing heavy coke forming or particulate components using a temperature quench of a vapor stream, whereby catalyst coking rates are further decreased.

26. The method of claim 1, further comprising removing heavy coke forming or particulate components from a vapor stream using a cyclone, whereby catalyst coking rates are further decreased.

* * * * *

UNITED STATES PATENT AND TRADEMARK OFFICE
CERTIFICATE OF CORRECTION

PATENT NO. : 9,909,067 B2
APPLICATION NO. : 14/196920
DATED : March 6, 2018
INVENTOR(S) : Daren Daugaard et al.

Page 1 of 1

It is certified that error appears in the above-identified patent and that said Letters Patent is hereby corrected as shown below:

In the Claims

Please correct Claim 16 to read as:
16. The method of claim 2 wherein all of the stations are contained within a single auger shell.

Signed and Sealed this
Twelfth Day of June, 2018

Andrei Iancu
*Director of the United States Patent and Trademark Office*